US009256595B2

(12) United States Patent
Heidasch et al.

(10) Patent No.: US 9,256,595 B2
(45) Date of Patent: Feb. 9, 2016

(54) CALCULATING TERM SIMILARITY USING A META-MODEL SEMANTIC NETWORK

(75) Inventors: Robert Heidasch, Speyer (DE); Stefan Scheidl, Dieburg (DE); Michael Neumann, Speyer (DE); Stephan Brand, Wiesloch (DE); Nico Licht, Heidelberg (DE); Klaus Reichenberger, Frankfurt (DE); Archim Heimann, Wiesloch (DE); Steffen Moldaner, Riedstadt (DE)

(73) Assignees: SAP SE, Walldorf (DE); intelligent views, gmbh, Darmstadt (DE)

( * ) Notice: Subject to any disclaimer, the term of this patent is extended or adjusted under 35 U.S.C. 154(b) by 1003 days.

(21) Appl. No.: 13/284,695

(22) Filed: Oct. 28, 2011

(65) Prior Publication Data

US 2013/0110496 A1     May 2, 2013

(51) Int. Cl.
*G06F 17/27*     (2006.01)
*G06F 17/30*     (2006.01)
*G06N 5/02*     (2006.01)

(52) U.S. Cl.
CPC ...... *G06F 17/2795* (2013.01); *G06F 17/30734* (2013.01); *G06F 17/2785* (2013.01); *G06N 5/02* (2013.01)

(58) Field of Classification Search
CPC ............ G06F 17/2785; G06F 17/2795; G06F 17/30734; G06F 17/30011; G06N 5/02; G06N 3/08
USPC ................... 704/9; 706/12; 707/803
See application file for complete search history.

(56) References Cited

U.S. PATENT DOCUMENTS

| 6,675,159 | B1 * | 1/2004 | Lin et al. | |
|---|---|---|---|---|
| 2002/0059161 | A1 * | 5/2002 | Li | 707/1 |
| 2003/0041047 | A1 * | 2/2003 | Chang et al. | 707/1 |
| 2003/0130976 | A1 * | 7/2003 | Au | 706/55 |
| 2004/0093328 | A1 * | 5/2004 | Damle | 707/3 |
| 2005/0165600 | A1 * | 7/2005 | Kasravi et al. | 704/9 |
| 2006/0195407 | A1 * | 8/2006 | Athelogou et al. | 706/12 |
| 2007/0239697 | A1 * | 10/2007 | Chen et al. | 707/4 |
| 2008/0270120 | A1 * | 10/2008 | Pestian et al. | 704/9 |
| 2009/0037389 | A1 * | 2/2009 | Kothari et al. | 707/3 |

(Continued)

FOREIGN PATENT DOCUMENTS

EP     2199926 A2     6/2010

OTHER PUBLICATIONS

Andrea et al. "Determining Semantic Similarity among Entity Classes from Different Ontologies", IEEE Transactions on Knowledge and Data Engineering, vol. 15, No. 2, Mar./Apr. 2003.*

(Continued)

*Primary Examiner* — Jialong He
(74) *Attorney, Agent, or Firm* — Schwegman Lundberg & Woessner, P.A.

(57) ABSTRACT

In example embodiments, a technique is provided to determine the similarity between two terms. For example, example embodiments may store a meta-model semantic network that includes a first and second term. Further, both the first and second terms are respectively associated with model and meta-model information. A request to calculate a term similarity value is received. A term similarity value expresses a correlation between the first term and the second term. The term similarity value is then calculated based on a comparison of the model and the meta-model information associated with the first and second terms.

17 Claims, 8 Drawing Sheets

(56) References Cited

U.S. PATENT DOCUMENTS

2009/0327259 A1* 12/2009 Smith .............................. 707/5
2010/0185689 A1* 7/2010 Hu et al. ...................... 707/803
2011/0040712 A1* 2/2011 Painter ........................... 706/12

OTHER PUBLICATIONS

Zhong et al. "Conceptual Graph Matching for Semantic Search", ICCS 2002, LNAI 2393, pp. 92-106, Springer-Verlag Berlin Heidelberg, 2002.*

"European Application Serial No. 12006184.1, European Search Report mailed Mar. 13, 2013", 11 pgs.

Brockmans, Sara, et al., "Visual Modeling of OWL DL Ontologies Using UML", ISWC 2004, LNCS 3298, (Jan. 1, 2004), 198-213.

Cuevas, Alma-Delia, et al., "Automatic Fusion of Knowledge Stored in Ontologies", Intelligent Decision Technologies, vol. 4, No. 1, (Jan. 1, 2010), 1-24.

Ehrig, Marc, et al., "Simiarity for Ontologies—a Comprehensive Framework", Proceedings of the Workshop on Ontology and Enterprise Modelling: Ingredients for Interoperability—In Conjunction with 5th International Conference on Practical Aspects of Knowledge Management, [Online]. Retrieved from the Internet: <URL: URL:http://cms.dke.univie.ac.at/fileadmin/ DKEHP/publikationenjmetamodell/Proceedings Workshop! PAKM2004.pdf#page=13>, (Dec. 2, 2004), 12 pgs.

Euzenat, Jerome, et al., "Similarity-based ontology alignment in OWL-Lite", 16th European Conference on Artificial Intelligence, [Online]. Retrieved from the Internet: <URL: URL:http:ffwww.frontiersinai.comjecaijecai 2004jecai04/pdf/p0323.pdf >, (Aug. 22, 2004), 5 pgs.

Neumann, T., et al., "Scalable Join Processing on Very Large RDF Graphs", Proceedings of the 35th SIGMOD International Conference on Management of Data, SIGMOD •09,, (2009), 627-640.

Wu, Jiewen, "A Study of Ontology-based Query Expansion", Technical Report CS-2011-04, [Online]. Retrieved from the Internet: <URL: URL:https:jjcs.uwaterloo.cajresearchjtr/20 11>, (Feb. 9, 2011), 38 pgs.

* cited by examiner

CALCULATING TERM SIMILARITY USING A META-MODEL SEMANTIC NETWORK

FIELD

The present disclosure relates generally to modeling terminology. In an example embodiment, the disclosure relates to determining whether two terms are similar.

BACKGROUND

Current software development environments and platforms present a number of technical challenges to the management of such environments and platforms for developers or other end-users. These technical challenges arise from the ever increasing complexity of the system landscapes, where required information may be distributed and scattered across many information sources. These distributed information sources may contain information that is required by an end-user to manage, operate, and understand an enterprise and its development environments and platforms. For example, such distributed information may include the terminology used within an enterprise to represent enterprise concepts, such as, for example, a product.

FIG. 1 is a block diagram showing an example prior art software development environment 100 in which an end-user may be required to deal with a number of different and heterogeneous information sources 104, 106, and 108 that together are accessible via an information repository 110 of a software development platform. Business applications are examples of the information sources 104, 106, and 108. The information repository 110 may be accessed, for example, by the end-user utilizing a computer system 112 that is communicatively coupled to the information repository 110 via a network 114 (e.g., the Internet, a Wide Area Network (WAN) or a Local Area Network (LAN)).

The information stored in information sources 104, 106, 108 may include terminology related to particular concepts. However, the information sources 104, 106, 108 may each use different terms to represent the same concepts. Further, the terminology utilized in information sources 104, 106, 108 may not be maintained by a single entity. For example, one data source may be maintained by one corporate department and another data source may be maintained by another department.

Where terms are used inconsistently by an enterprise, a number of technical challenges are presented to the end-users. To illustrate, a search engine may search information sources 104, 106, 108 using an indexer that links information (e.g., documents) to predefined terms. However, where multiple terms are used for a single concept, there is a risk that the indexer will not link all the terms to the document. Accordingly, to find a document, the user must use the same term used to by the indexer.

To link inconsistent terms to a single concept, it is common to provide a semantic network. For example, such a semantic network may link all the product names assigned to a product to the single concept of the product. Where multiple terms are linked to the same concept, the terms may be considered synonyms, and a search engine may perform a search using the synonyms of a term submitted by the user. However, such an approach relies on an expert to properly link the various terms to the appropriate concept. Where the expert is a human, the semantic network approach then suffers from human error.

BRIEF DESCRIPTION OF DRAWINGS

Some embodiments are illustrated by way of example and not limitation in the figures of the accompanying drawings in which.

DETAILED DESCRIPTION

Figure 1:
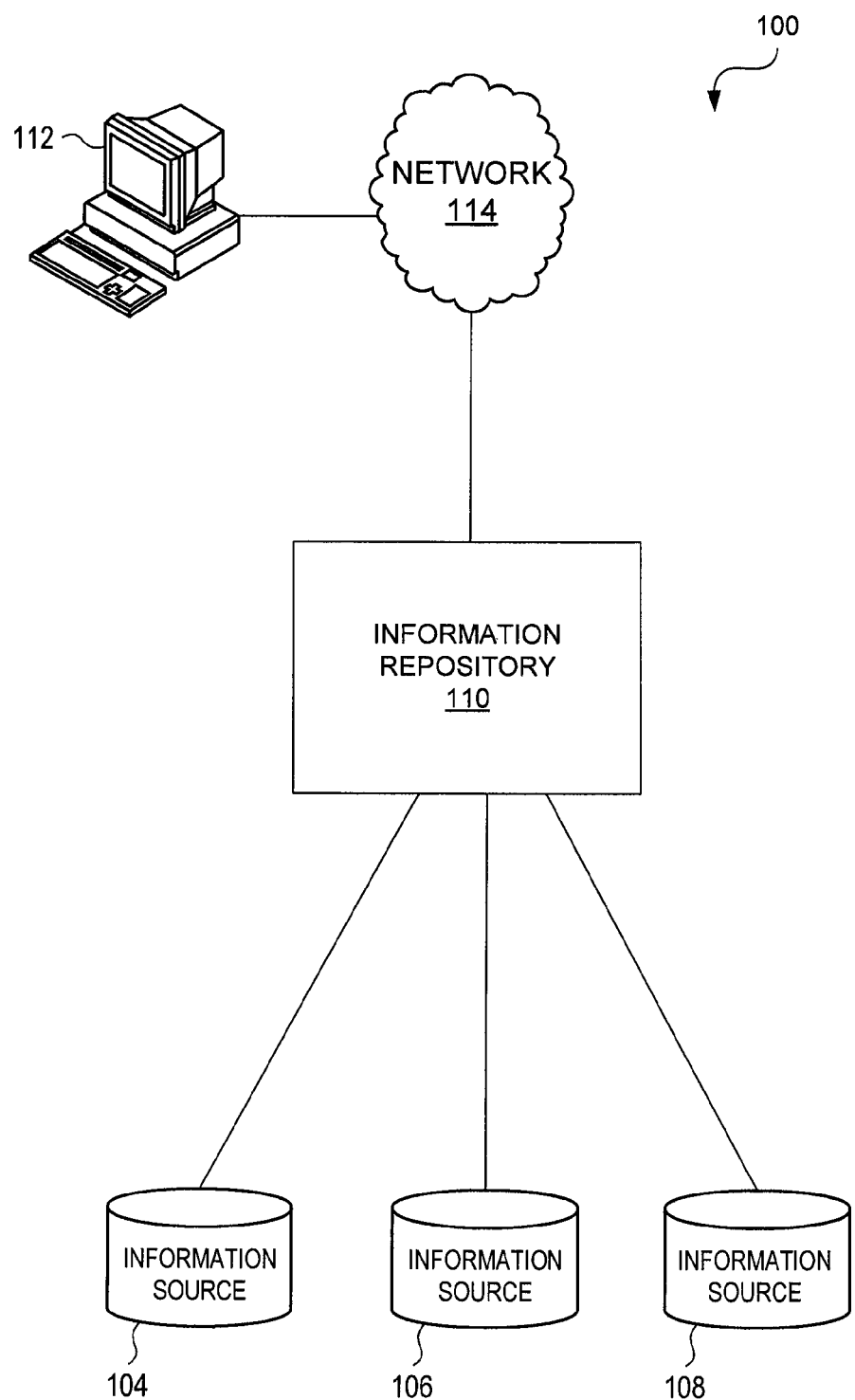
FIG. 1 is a block diagram showing an example prior art software development environment.

In the following description, for purposes of explanation, numerous specific details are set forth in order to provide a thorough understanding of some example embodiments. It will be evident, however, to one skilled in the art that some embodiments may be practiced without these specific details.

Example embodiments relate to techniques for determining the similarity between terms using a meta-model semantic network. As is described below, a meta-model semantic network may refer to a knowledge database that includes relationships or links between nodes, such as terms, concepts, domains, and any other suitable nodes. Further, as is explained below, the meta-model semantic network may organize data related to the first three layers of a meta-model. For example, with particular reference to a term, the meta-model semantic network includes a term (e.g., the instance layer), attributes that characterize the term (e.g., the model layer), and definitions for the attributes (e.g., the meta-model layer). Such a construct is similarly applied to the domain nodes, concept nodes, and relationship nodes of the meta-model semantic network.

In some embodiments, a "model," as used herein, is one or more attributes that characterize an instance. An instance may be a term, concept, domain, or any other suitable node included in a meta-model semantic network. A part of speech, placement within a sentence, tense, and a frequency of use are examples of attributes that may form a model of a term. As a further example, a concept may be associated with a model that characterizes a product, such as attributes containing values of a name, release date, program manager, department, company, or any other suitable attribute.

In some embodiments, a "meta-model," as used herein, is a characterization of a model. For example, a meta-model may characterize an attribute by defining an attribute type associated with a model. For example, a concept of a company may be associated with a model that includes a location attribute.

The location attribute may include values associated with "San Diego," "Calif.," "55 Elm Street," and "55555." A meta-model corresponding to the model of the concept of the company may include an attribute definition that characterizes the location attribute. For example, such a meta-model may include type definitions that correspond to a city attribute type, a state attribute type, a street attribute type, and a zip code attribute type. A meta-model may be associated with various models included in the meta-model semantic network, such as a term, concept, domain, or any other suitable model.

In some embodiments, the similarity of terms is determined based on a term sense. As used herein, a "term sense" may refer to the elements of the meta-model semantic network that form the meaning or sense of a term. As described below, some embodiments compare the particular elements of the term sense to calculate a similarity value of two terms.

In some embodiments, the elements of a meta-model semantic network are stored as singletons. As used herein, a "singleton" may refer to an object that exists with no more than one instance. For example, there may be a single instance of a specific attribute that is commonly shared by two or more elements of the meta-model semantic network. Such a technique provides the technical advantages of allowing for compressed format of the meta-model semantic network.

In example embodiments, determining the similarity between terms using a meta-model semantic network may involve a calculation of a term similarity value for the terms. The term similarity value may be calculated based on a function of the various nodes, attributes of the various nodes, and definitions of the attributes. For example, such a function may calculate a distance based on the location of such elements as they are stored in memory.

Figure 2:
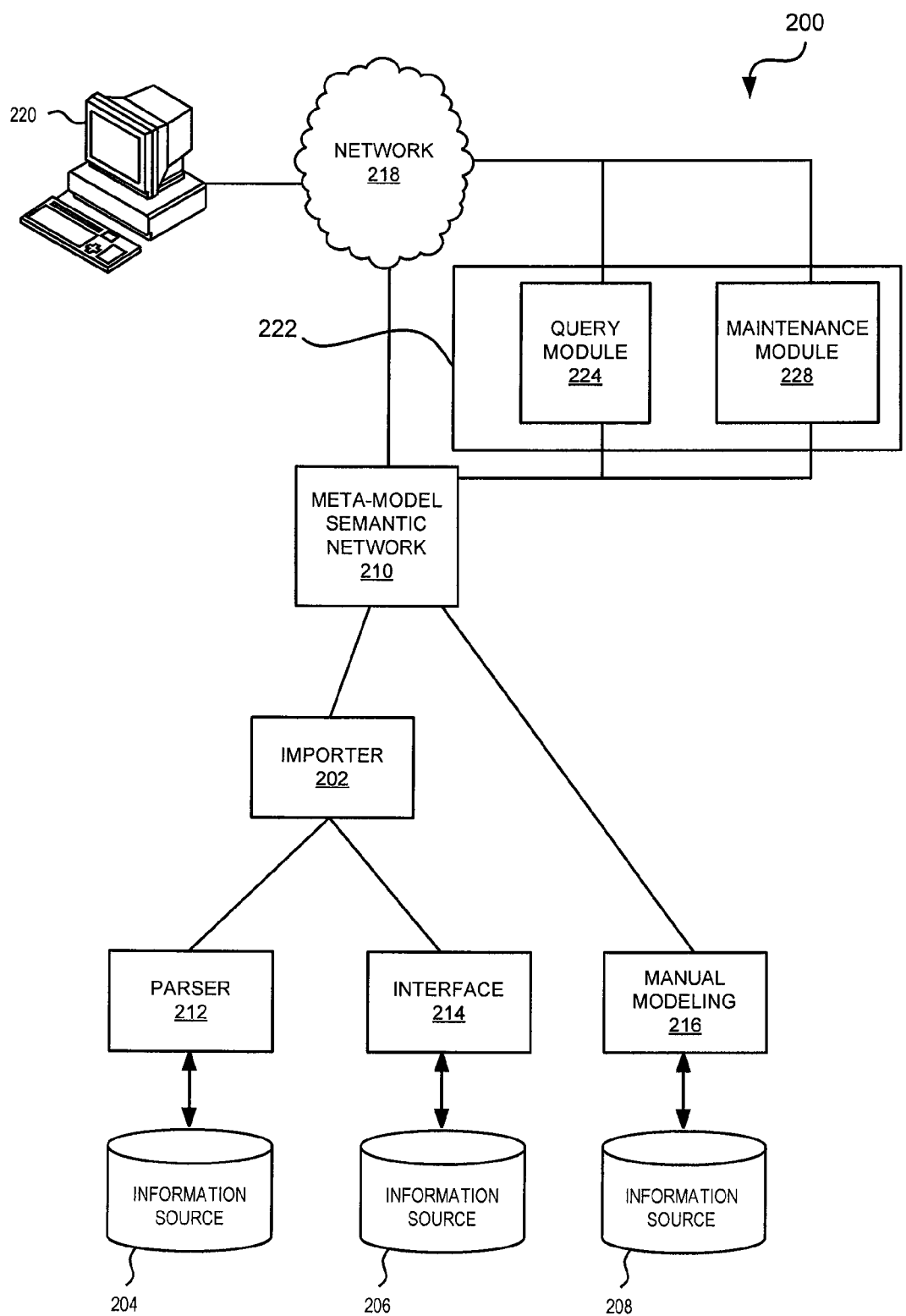
FIG. 2 is a block diagram illustrating an example software development environment and platform, according to an example embodiment.

FIG. 2 is a block diagram illustrating a software development environment and platform 200, according to an example embodiment. A meta-model semantic network 210 is used to integrate a number of heterogeneous information sources 204, 206 and 208. The meta-model semantic network 210, in the example embodiment, represents a conceptual model of the terms found in the information sources 204, 206, 208. The meta-model semantic network 210 may furthermore be defined to provide a logic-based representation formalism to the terms found in the number of information sources 204, 206, 208, with the information sources 204, 206, 208 having heterogeneous representation formalisms. As is described in greater detail below, the meta-model semantic network 210 may be a semantic network that is extended to include meta-modelling data.

In an example embodiment, the information sources 204, 206, 208 are transformed once to the meta-model semantic network 210. For information sources expressed in formal languages (e.g., Extensible Markup Language (XML)), such a transformation may be achieved automatically via mappings. For information sources not expressed in formal languages (e.g., expressed in natural language), a transformation may be manually performed. For example, natural language statements within a natural-language information resource may be manually represented via logical formulae. After the transformation of the various original information sources 204, 206, 208, in one example embodiment, only the meta-model semantic network 210 is maintained, and derivative information sources are generated automatically from the meta-model semantic network 210. In various example embodiments, the automatic generation of derivative information sources from the meta-model semantic network 210 may occur at design time, deployment time or run time.

In the example software development environment and platform 200 shown in FIG. 2, a terminology importer 202 may be provided with XML data extracted by a parser 212 from a first information source 204. The terminology importer 202 may further extract information from a second information source 206 via an interface module 214 that provides a programmatic interface to the terminology importer 202. A third information source 208 may store information in a natural language format, which uses manual modeling 216 to transform the third information source 208 to the meta-model semantic network 210.

FIG. 2 also illustrates that the meta-model semantic network 210 is accessible via a network 218 to the computer system 220 of an end-user, and the integration of reasoning support 222 into the development environment or platform 200 through the deployment of reasoning modules that are communicatively coupled to, or integrated with, the meta-model semantic network 210. To this end, a query module 224 processes queries against the meta-model semantic network 210 and a term maintenance module 228 operates to facilitate updates to the meta-model semantic network such that the terms remain consistent with respect to existing terms. The reasoning support 222 is accessible, via the network 218, to an end user.

Figure 3:
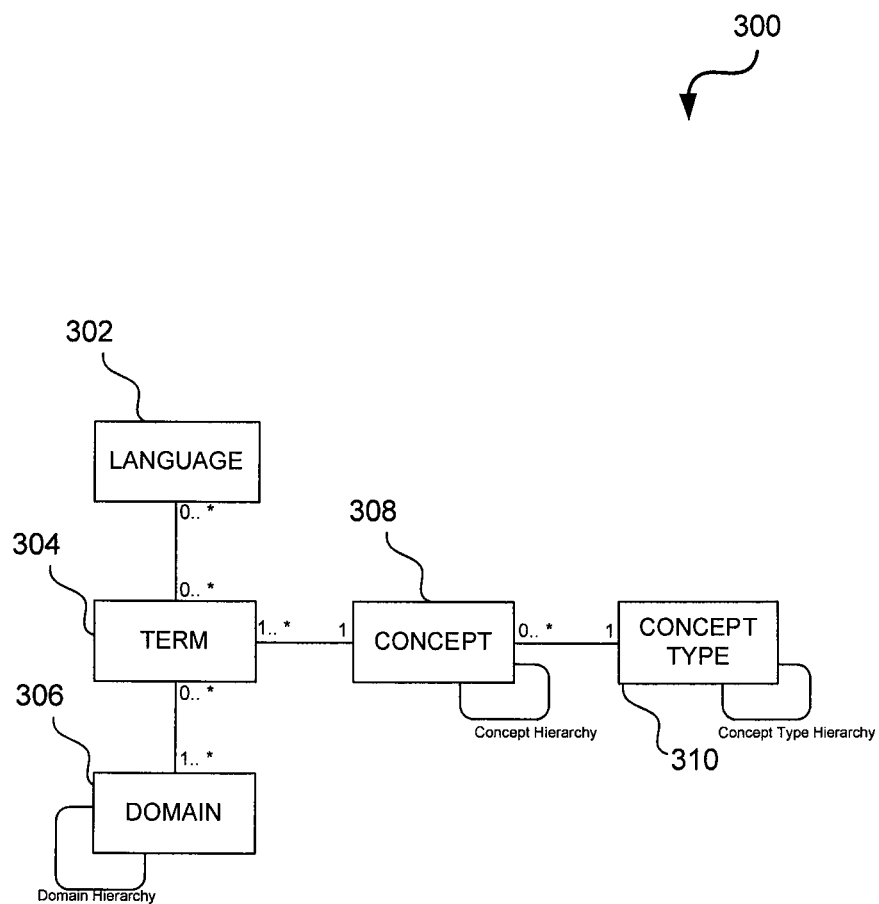
FIG. 3 is a block diagram illustrating a simplified model of an example terminology, according to an example embodiment.

Further details regarding the meta-model semantic network 210 illustrated in FIG. 2 will now be described with reference to a number of subsequent figures. In particular, to provide context for a meta-model semantic network, a semantic network is first described. FIG. 3 is a diagram that shows an example of a semantic network 300, according to various embodiments. The semantic network 300 is a network that represents semantic relations among terms and concepts. The semantic network 300 may be used as a form of knowledge representation. Accordingly, the semantic network 300 may be used to model business knowledge in companies, such as, for example, enterprise knowledge and/or terminology.

As FIG. 3 shows, the semantic network 300 links a term 304 to a language 302, one or more domains 306, and a concept 308. In turn, the concept 308 may be linked to a concept type 310. The links between the various components of the semantic network 300 may define the cardinality of the relationship between the components. For example, the link from the concept 308 to the concept type 310 shows a cardinality of "1," which is to be interpreted as an association with one and only one. Thus, the concept 308 may be linked to 1 and only 1 concept type 310. As another example, at the term end of the the Term-Language link, the link shows a cardinality of "0 . . . *." The symbol "*" is to be interpreted as any number. Thus, a language may be linked to zero or many terms.

The term 304 may be a word or phrase found in a business application, a document, the Internet or Web, or manually created by an end-user. The concept 308 may refer to a unit of meaning to which the term 304 refers, such as a specific idea or notion. The concept 308 groups all the terms that are used to express the specific idea as synonyms. For example, the terms "COLGATE," COLGATE-PALMOLIVE," "C-P," and "CP" may refer to the concept of the company Colgate-Palmolive. Accordingly, "COLGATE," "COLGATE-PALMOLIVE," "C-P," and "CP" are all synonyms for the Colgate-Palmolive company concept.

The domain 306 may define the knowledge domain or a particular field of knowledge. The domain 306 may group terms used within a particular context. In some cases, the concept related to the term may depend on the domain. For example, the meaning of the term Colgate may differ depending on whether the term is used in the domain of toothpaste rather than in the domain of colleges. As FIG. 3 shows, the domain may be associated with a hierarchy of domains.

The language 302 may distinguish the language that the term 304 is used in. For example, the concept a term relates to may depend on the language associated with the term. For example, the term "SOY" associated with the language "SPANISH" will be distinguished from the term "SOY" associated with the language "ENGLISH."

The concept type 310 may be metadata that characterizes the attributes associated with the concept. The concept type 310 may, for example, describe the attributes associated with the concept "COMPANY," or any other suitable concept.

Semantic networks, such as semantic network 300 shown in FIG. 3, are typically created by importing data from business applications, documents stored in a knowledge database or the Internet, or by manual input by end-users. One technical challenge that is presented in creating a semantic network, such as that shown in FIG. 3, is the inadvertent duplication and categorization of terminology. Such may be the case where various departments may refer to a product with one or more different terms. Further, were a user attempts to add a term to the semantic network, there is a risk that the user is unaware of an existing or more suitable concept that should be linked to the term.

Figure 4:
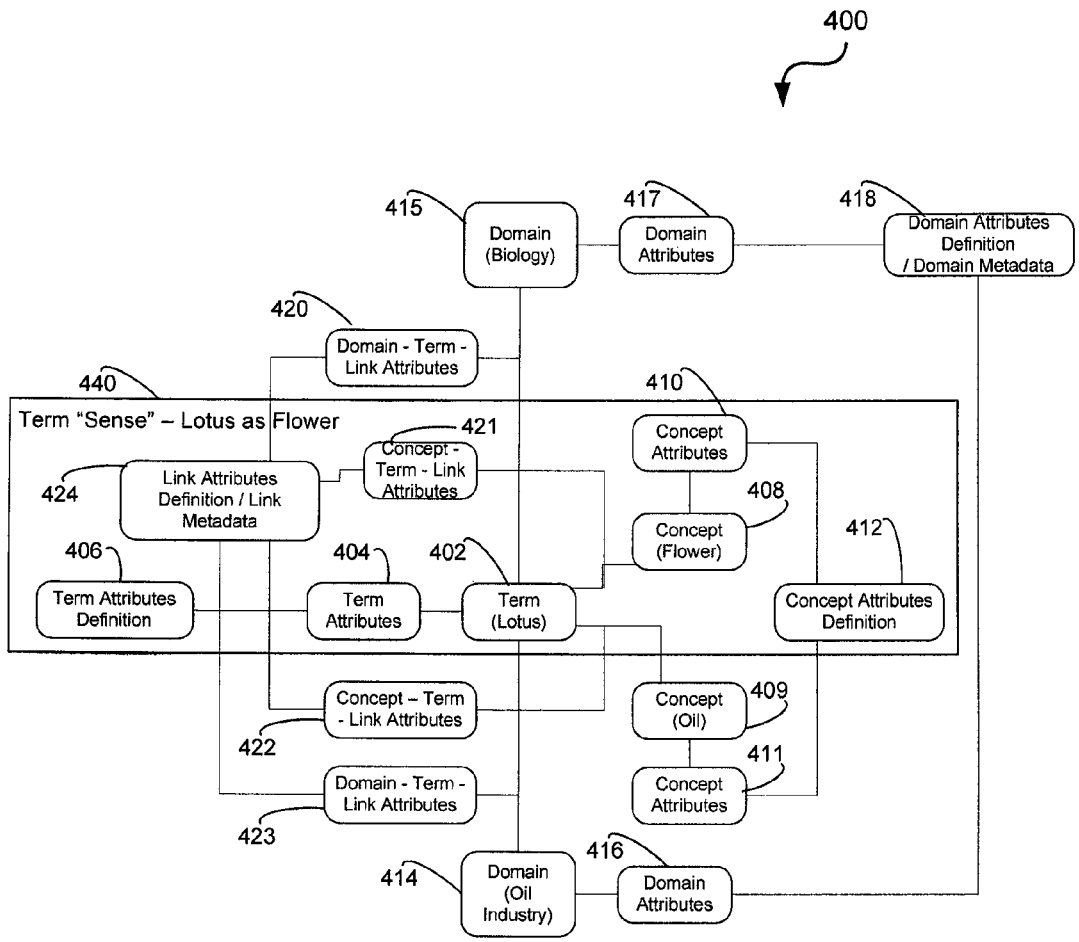
FIG. 4 is a block diagram illustrating a simplified meta-model semantic network that models an example terminology, according to an example embodiment.

To overcome such technical challenges, embodiments may determine, among other things, whether two terms are related to each other. To facilitate this determination, embodiments may utilize a meta-model semantic network 400, as shown in FIG. 4. The meta-model semantic network 400 may incorporate meta-model information in a semantic network. In particular, meta-model information may be based on the four layer Meta Object Facility (MOF) standard. Utilizing such standards, the meta-model semantic network 400 may incorporate instance information (e.g., M0 layer information), model information (e.g., the M1 layer information), and meta-model information (e.g., the M2 layer information). For example, the meta-model semantic network 400 may include layers of information, such as information regarding an object (e.g., a term, concept, domain, or link), an object's model (e.g., attributes associated with a term, concept, domain, or link), and a model's meta-model (e.g., a definition of an attribute).

For example, as FIG. 4 shows, a term element 402 contains the value of the term (e.g. "Lotus"). The term element 402 is assigned to the term attributes element 404 that characterizes the particular term (e.g., "Lotus"). The term attribute element 404 may store singleton values. A "singleton value," as used herein, may refer to an attribute value that can be shared between different term elements. Accordingly, the attribute value may be linked to an existing term attribute value and, as a result, only one value of the term is defined in meta-model semantic network 400. Such may be the case because the information is available on the same information level, such as the M0 level (e.g., instance value level) defined in the MOF standard and further adopted in the Eclipse Modeling Framework (EMF).

In turn, the term attributes element 404 is characterized by term attribute definition 406. The term attributes definition 406 may be metadata that describes the definition of the term elements on a higher information level (e.g., the M2 level, the meta-model layer).

Accordingly, the term, term attribute, and term attribute definition association follows an object—object attribute— object attribute definition construct. As can be seen in FIG. 4, the object—object attribute—object attribute definition construct is continued for other elements of the meta-model semantic network 400. For example, concepts 408, 409 are respectively linked to concept attribute 410, 411, which are each in turn linked to concept attributes definition 412 (e.g., concept metadata). Further, domains 414, 415 are respectively linked to domain attributes 416, 417, which are each in turn linked to domain attributes definition 418.

In comparison to the semantic network 300 of FIG. 3, the meta-model semantic network 400 may extend the object— object attribute—object attribute definition construct to apply also to the links between the various objects. For example, a link object is used to define relations between particular objects and also used for the attributes values. The link object (link instance) includes references to the start- and end-point to identify the linked elements with the link attributes. Link attributes include values that define the characteristics of the link or relationship between the start- and end-point.

A link and link attribute may define a relationship between two nodes. For example, the term LOTUS 402 be linked to the concept FLOWER 408 with an IS-A link. In turn, the concept- term link attributes 421 may include values that define what an IS-A link means as a formal representation. This example link may be illustrated with a conceptual notation that the term "Lotus is a flower." In this situation the link is describing the "is a" relationship and the attributes define what the "is a" relationship means. The meta-model may characterize the meaning of the attributes that describe the relationship of the link.

As FIG. 4 shows, the meta-model semantic network 400 may include domain—term link attributes 420, 423; concept—term link attributes 421, 422; and link attributes definition 424.

Still further, the meta-model semantic network 400 may include a term sense 440. The term sense 440 may specify the attributes, attribute definitions, and associations that refer to a particular sense of a term. Thus, as shown in FIG. 4, the term LOTUS as the concept FLOWER may include term attributes element 404, term attributes definition 406, concept 408, concept attributes 410, concept attributes definition 412, concept—term link attributes 421, and link attributes definition 424.

As described above, the various elements attribute values, attribute definitions, and attribute types shown in the meta-model semantic network 400 may be stored as singletons. Thus, the elements attribute values, attribute definitions, and attribute types may be referenced via unique identifiers, such as an index, pointer to memory location, and the like. For example, elements attribute values, attribute definitions, and attribute types may be presented in a numeric form, such as a hash value.

The use of singletons within the meta-model semantic network 400 allows embodiments to use an in-memory database, such as the one provided by HANA, as developed by SAP. In particular, in-memory databases may provide the technical benefit of compressing the potentially large amount of data in the meta-model semantic network 400. Further, in-memory databases may allow for comparatively fast operations. Further, the singleton elements are located in particular memory area, and the memory addresses for the particular area may be used in the pointing mechanism and also reused for the hash value determination.

Further details regarding the operations performed with the various components illustrated in FIGS. 2-4 will now be described with reference to a number of subsequent figures.

Figure 5:
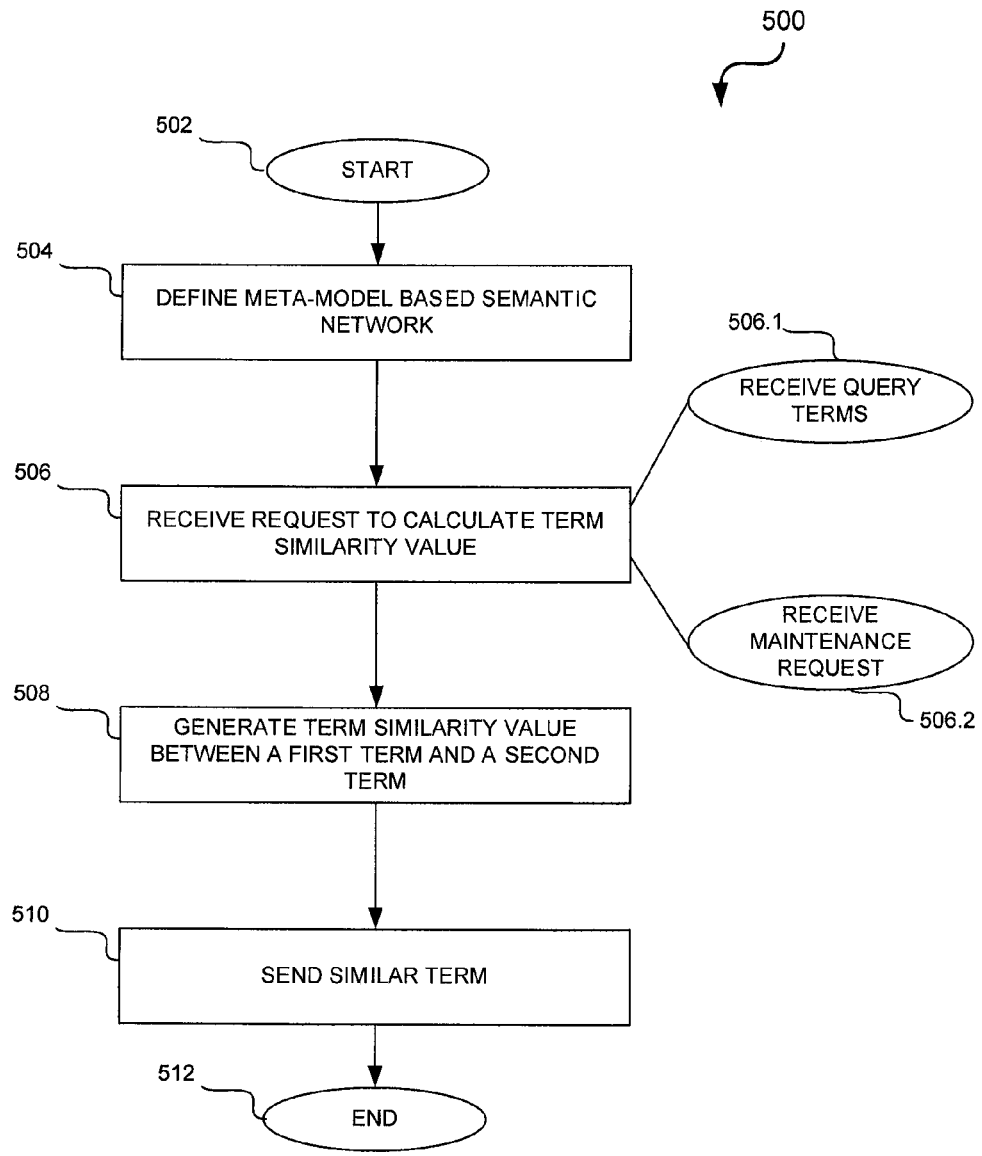
FIG. 5 is a flow diagram illustrating a method of determining whether two terms are similar, according to an example embodiment.

FIG. 5 is a flowchart illustrating a method 500, according to an example embodiment, to provide terminology integration, with reasoning support, in a software development environment or platform, such as the environment or platform 200. The method 500 may be performed by any one of the modules, logic or components described herein and not necessarily by the exact components described with reference to FIG. 2. For example, various functions may be distributed across components of the computer systems that are communicatively coupled via a network.

The method 500 starts at 502 and proceeds to operation 504 by defining the meta-model semantic network 210. As noted, the meta-model semantic network 210 provides a logic-based representation formalism for the terminology found in a number of original information sources 204, 206, 208. In some embodiments, the meta-model semantic network 210 is defined according to structured data found in the information sources 204, 206, 208. Accordingly, terms stored in the information sources 204, 206, 208 may be transformed, adopted, or lifted to define the meta-model semantic network 210. In other embodiments, an administrator defines the meta-model semantic network 210.

At the conclusion of operation 504, a meta-model semantic network, such as the meta-model semantic network 400 of FIG. 4, is defined and contains the terms found in information sources 204, 206, 208. As described above, with reference to FIG. 4, the meta-model semantic network 400 includes associations between instances of terms, concepts, domains, and relationships; attributes of the terms, concepts, domains, and relationships (e.g., information at the model level); and attribute definitions for the attributes of the terms, concepts, domains, and relationships (e.g., information at the meta-model level).

At operation 506, modules 224 and 228 receive, from the client device 220, a request to calculate a term similarity value from the terms stored in the meta-model semantic network 210. A "term similarity value," as used herein, may refer to a value that expresses a correlation between two terms. In some embodiments, a term similarity may be expressed numerically. For example, a term similarity may be expressed by a number that is greater than or equal to 0 and less than or equal to 1, wherein a higher number signifies a closer related term than a lower number. It is to be appreciated that the above example range is provided for illustration and that many other values may be utilized in other example embodiments.

In one example embodiment, the request to calculate the term similarity value is received as part of a query submitted to the query module 224. This is shown as sub-operation 506.1. For example, an end-user may use the query module 224 to search the information sources 204, 206, 208 for documents that contain a particular term. Thus, the query module 224, responsive to receiving such a query, may request a term similarity value between a term in the query and other various terms in the meta-model semantic network 210.

As another example, the maintenance module 228 may receive a request from the client device 220 to add a term to the meta-model semantic network 210. This is shown as sub-operation 506.2. Once the maintenance module 228 adds the term and its characteristics to the meta-model semantic network 210, the maintenance module 228 may determine whether any pre-existing terms are similar to the new term. Such similar terms may indicate that the term-concept is already present in the meta-model semantic network 210. Accordingly, the maintenance module 228 may wish to merge the new and similar terms together to avoid redundant terms.

It is to be appreciated that sub-operations 506.1-2 are provided merely for the purpose of illustrating some example embodiments. Accordingly, other embodiments may be practiced with sub-operations that are different than the sub-operations described herein.

At operation 508, modules 224 and 228 generate, from the meta-model semantic network 210, a similarity value between a first term and a second term. In one example embodiment, the first term may be a term received in a query request or, as a further example, a new term being added to the meta-model semantic network 210. As described above, a term similarity value may be a value that expresses a correlation between two terms. Methods for generating the term similarity value are described in greater detail below.

Based on the term similarity value, the similar term is sent at operation 510. A "similar term," as used herein, may refer to a second term where the term similarity value between the second term and the first term meets a determinable condition, such as a threshold value. In some embodiments, the similar term is sent to the modules 224 and 228. For example, the similar term is sent to the query module 224 so that the query module can modify the query to include the similar term. In other embodiments, the similar term is sent to the maintenance module 228 so that the maintenance module 228 may indicate that the first term and the similar term may relate to the similar concepts.

In some embodiments, the similar term may be displayed by the client device 220 (e.g., a terminal, client computer, laptop, mobile device, or any other suitable computational device).

The method 500 then terminates at operation 512.

Figure 6:
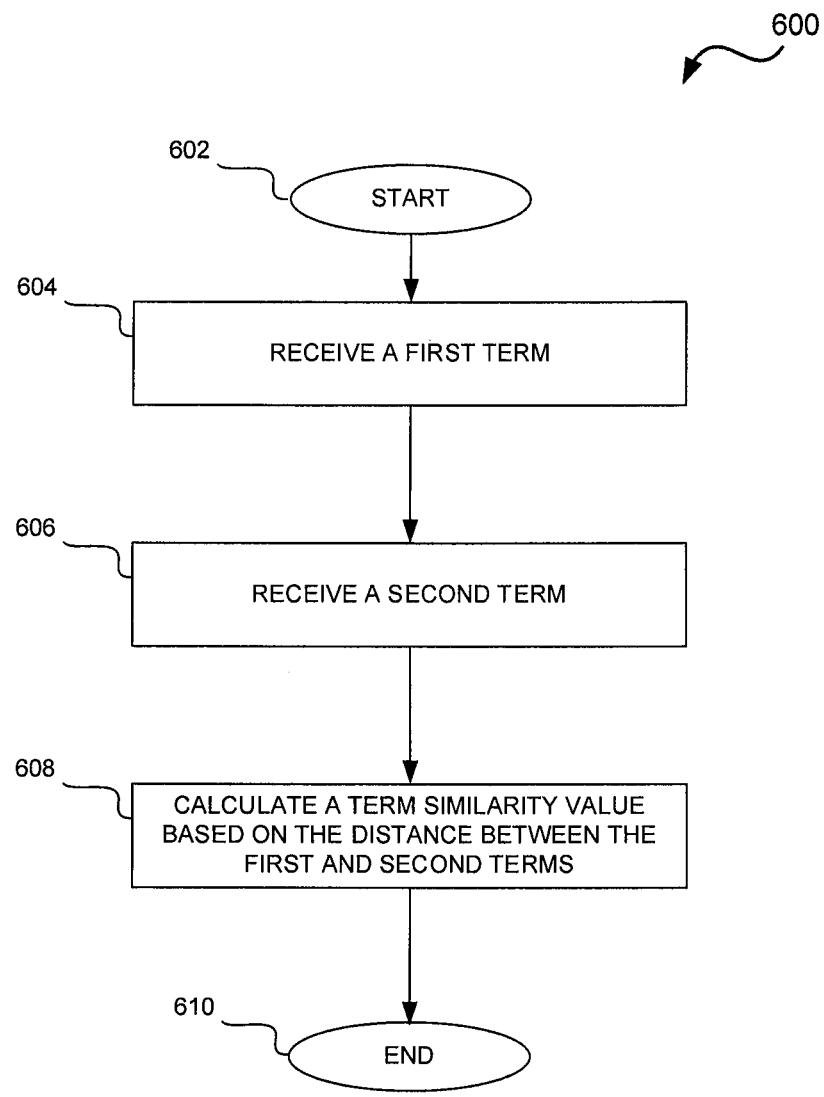
FIG. 6 is a flow diagram illustrating a method for calculating a term similarity value, according to an example embodiment.

With specific reference to operation 506 of method 500, FIG. 6 is a flowchart illustrating a method 600, according to an example embodiment, of generating a term similarity value between a first and second term. The method 600 may be performed by any one of the modules, logic or components described herein and not necessarily by the exact components described with reference to FIG. 2. For example, various functions may be distributed across components of the computer systems that are communicatively coupled via a network. As described above, a term similarity value may refer to a value that expresses a correlation between two terms, which may be expressed through a numeric range that indicates whether two terms are more or less similar to each other.

The method 600 starts at 602 and proceeds to operation 604 by receiving a first term. As described above, the first term may be received via a user interface provided by the query module 224 when a user submits a query on information sources 204, 206, 208. In another embodiment, the first term may be received via a user interface provided by the maintenance module 228 when an administrator adds a term to the meta-model semantic network 210.

At operation 606, the method 600 receives a second term. In an example embodiment, the second term may be received from the terms existing in the meta-model semantic network 210. For example, the query module 224 or the maintenance module 228 may select an existing term according to a loop that iterates over a set of terms in the meta-model semantic network.

At operation 608, the method 600 calculates a term similarity value based on the distance between the first and second terms. In general, the distance between a first term and second term may be measured according to a function that compares the attribute values and the attribute definition for each of the elements associated with the two term. As described above, and explained in further detail below, such a similarity value may be calculated based on the elements of a term sense (e.g., the particular attributes, links, and definitions that form a particular meaning of a term).

The method 600 then terminates at operation 610.

Figure 7:
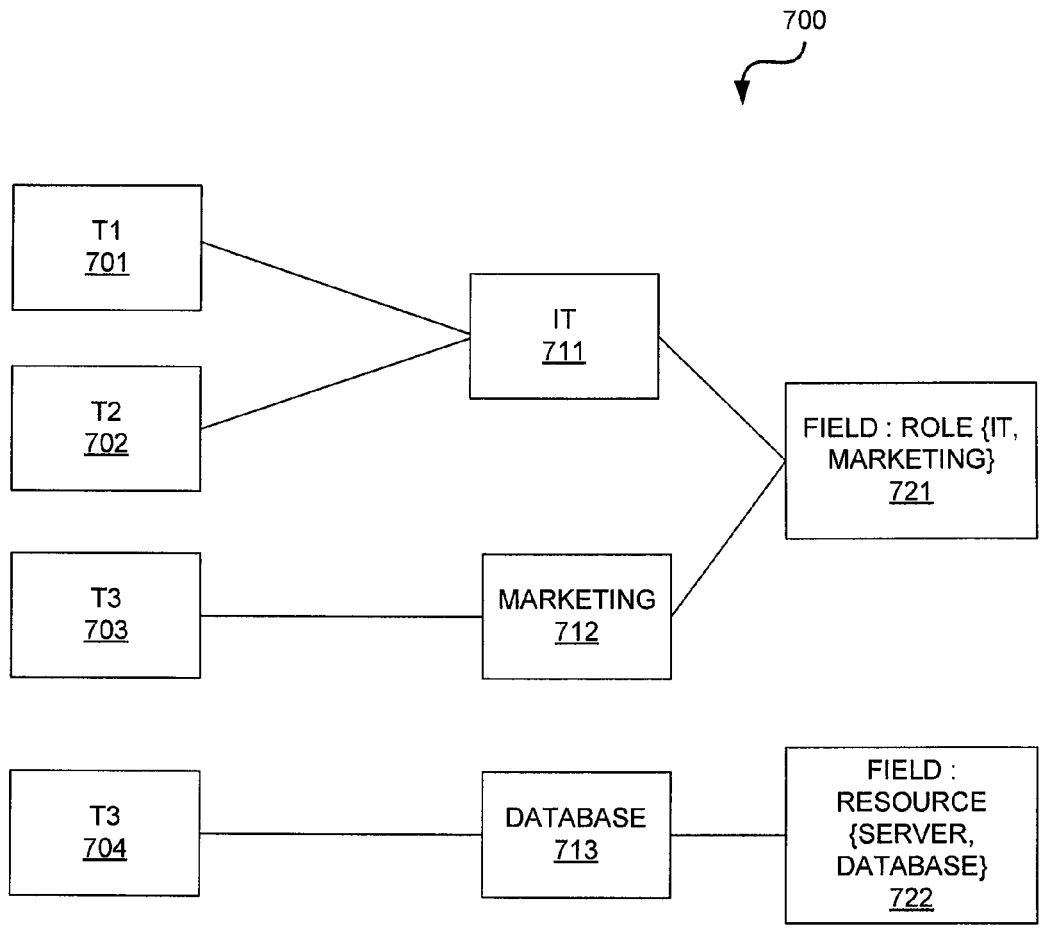
FIG. 7 is a block diagram demonstrating term similarity between example terms, attributes, and attribute definitions, according to an example embodiment.

For example, FIG. 7 shows a block diagram that includes terms 701-704, attributes 711-713, and attribute definitions 721-722. As FIG. 7 shows, terms 701, 702 share the same attribute 711 and, in turn, the attribute 711 is associated with the attribute definition 721. Thus, terms 701, 702 are highly correlated, or, in other words, show a high degree of term similarity. Accordingly, terms 701, 702 may be assigned the term similarity value 0.8.

In contrast, term 703 is assigned an attribute 712 that is different than the attribute 711. However, attribute 712 is associated with the attribute definition 721, similar to attribute 711. Thus, there is some relatedness between term 701, for example, and term 703. Accordingly, terms 701, 703 may be assigned the term similarity value 0.5.

In further contrast, term 704 does not share a common attribute because term 704 is associated with attribute 713. Further, the attribute 713 is associated with attribute definition 722, which is different than attribute definition 721. Thus, there is little relatedness between term 701, for example, and term 704. Accordingly, terms 701, 703 may be assigned the term similarity value 0.1.

FIG. 7 is described with a simple example. In other embodiments, the relatedness between two terms may be measured using a function that measure the vector distances between the attributes of a term's instance, model, and meta-model. For example, the distance between two terms may be, calculated according to the following example distance function:

$$\begin{aligned}\text{Distance Term (Term } A; \text{Term } B) = \\ +\text{Distance Instance (Element } N \text{ of Term } A, \text{Element } N \text{ of Term } B) + \\ \text{Distance Model (Element } N \text{ of Term } A, \text{Element } N \text{ of Term } B) + \\ \text{Distance Meta-model(Element } N \text{ of Term } A, \text{Element } N \text{ of Term } B)\end{aligned}$$

Where the function Distance Instance (Element N of Term A, Element N of Term B) may be calculated, in some embodiments, as:
sqrt(sum(pow2((instance value of distance (Element N of Term A, Element N of Term B)))).

Where the function Distance Model (Element N of Term A, Element N of Term B) may be calculated, in some embodiments, according to:
sqrt(sum(pow2 ((hash value of model attribute N (Term A, Term B)))))

Where the function Distance Meta-model (Element N of Term A, Element N of Term B) may be calculated, in some embodiments, according to:
sqrt(sum(pow2 ((hash value of meta-model attribute N (Term A, Term B)))))

Where the function sqrt (x) returns the square root of x; the function pow2(x) returns x raised to the power 2; and the function sum(x) returns the sum of all arguments. Accordingly, such calculations determine a first distance on a meta-model level and then a second distance on a model level (attributes) and then finally on the instance level (the terms used, which may reflect difference between terms that are misspelled (e.g., "flower" and "flover" (mistyped v)).

In some embodiments, the term similarity value may be based on a distance calculation between term senses. With reference to FIG. 4, the term sense 440 includes the term, term attribute, term metadata, concept, concept attribute, concept metadata and related links, link attribute, and link metadata.

Where the similarity of terms is based on term senses, the distance between two terms may be calculated as following:

Distance(Term sense A; Term sense B)=sqrt(sum(pow(distance (object A; object B))))

Where the distance (object A; object B) is the calculated distance of appropriate objects that form the term sense. The distance between the attribute of an instance, model, and meta-model are described above.

It is to be appreciated that the embodiments described herein solve a number of technical challenges. For example, determining the similarity between two terms using a meta-model semantic network allows for an administrator to maintain a knowledge database of terminology used within an enterprise without absolute knowledge of existing term-concept relationships. Such may be the case because embodiments described herein may automatically suggest that a new term has a high level of similarity to a set of other terms mapped to a different concept.

Still further, embodiments described herein may provide comparatively relevant searches. Such may be the case because embodiments may provide the user with suggested terms that are similar to the terms submitted in a search query. Alternatively, embodiments may automatically augment the search query to include highly similar terms.

Figure 8:
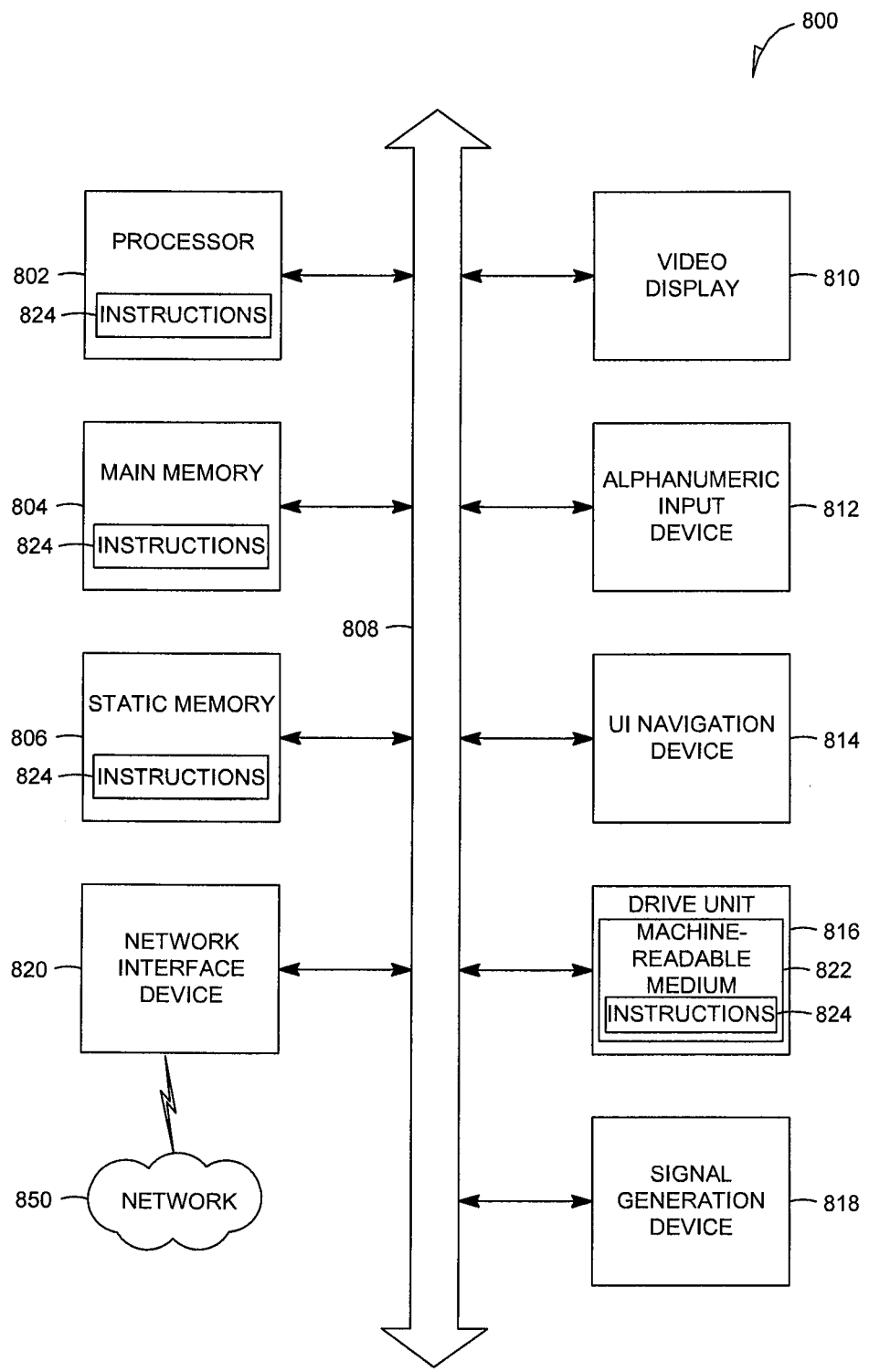
FIG. 8 is a block diagram of machine in the example form of a computer system within which a set instructions for causing the machine to perform any one or more of the methodologies discussed herein may be executed.

FIG. 8 depicts a block diagram of a machine in the example form of a computing device 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 800 includes a processor 802 (e.g., a central processing unit (CPU), a graphics processing unit (GPU) or both), a main memory 804 (e.g., random access memory), and static memory 806 (e.g., static random-access memory), which communicate with each other via bus 808. The computing device 800 may further include video display unit 810 (e.g., a plasma display, a liquid crystal display (LCD) or a cathode ray tube (CRT)). The computing device 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by computing device 800, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques for data searches using context information may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method comprising:
storing a meta-model semantic network, the meta-model semantic network including a first term and a second term, the first term being associated with a first model and a first meta-model, the second term being associated with a second model and a second meta-model, wherein the first model comprises one or more first attributes that characterize the first term, wherein the second model comprises one or more second attributes that characterize the second term, wherein the first meta-model characterizes the first model, wherein the second meta-model characterizes the second model, and wherein a link and a link attribute define a relationship between at least two nodes of the semantic network;
receiving a request to calculate a term similarity value, the term similarity value expressing a correlation between the first term and the second term;
calculating, using at least one processor, the term similarity value based on a distance between one of the first attributes of the first model and one of the second attribute of the second model, a distance between an attribute of the first meta-model and an attribute of the second meta-model, and a distance between an attribute of the first term and an attribute of the second term; and modifying one or more of a search query or the meta-model semantic network based on the term similarity value.

2. The method of claim 1, further comprising:
linking the first term to a concept in the meta-model semantic network; and
based on the calculated term similarity value, linking the second term to the concept.

3. The method of claim 1, further comprising defining a first term sense associated with the first term, the first term sense including specified models and specified meta-models of the meta-model semantic network.

4. The method of claim 3, wherein the calculation of the term similarity value comprises selecting the first model and the first meta-model based on the specified models and the specified meta-models included in the first term sense.

5. The method of claim 1, further comprising sending an indication that the first term and the second term in response to the similarity value meeting a threshold value.

6. The method of claim 1, wherein the calculation of the term similarity value comprises a comparison of:
a first link associated with the first term and a second link associated with the second term;
a first link attribute associated with the first link and a second link attribute associated with the second link; and
a first link attribute definition associated with the first link attribute and a second link attribute definition associated with the second link attribute definition.

7. A non-transitory, machine-readable medium that stores instructions, which, when performed by a machine, cause the machine to perform operations comprising:
storing a meta-model semantic network, the meta-model semantic network including a first term and a second term, the first term being associated with a first model and a first meta-model, the second term being associated with a second model and a second meta-model, wherein the first model comprises one or more first attributes that characterize the first term, wherein the second model comprises one or more second attributes that characterize the second term, wherein the first meta-model characterizes the first model, wherein the second meta-model characterizes the second model, and wherein a link and a link attribute define a relationship between at least two nodes of the semantic network;
receiving a request to calculate a term similarity value, the term similarity value expressing a correlation between the first term and the second term; and
calculating the term similarity value based on a distance between one of the first attributes of the first model and one of the second attributes of the second model, a distance between an attribute of the first meta-model and an attribute of the second meta-model, and a distance between an attribute of the first term and an attribute of the second term; and
modifying one or more of a search query or the meta-model semantic network based on the term similarity value.

8. The non-transitory, machine-readable medium of claim 7, further comprising:
linking the first term to a concept in the meta-model semantic network; and
based on the calculated term similarity value, linking the second term to the concept.

9. The non-transitory, machine-readable medium of claim 7, further comprising defining a first term sense associated with the first term, the first term sense including specified models and specified meta-models of the meta-model semantic network.

10. The non-transitory, machine-readable medium of claim 9, wherein the calculation of the term similarity value comprises selecting the first model and the first meta-model based on the specified models and the specified meta-models included in the first term sense.

11. The non-transitory, machine-readable medium of claim 7, further comprising sending an indication that the first term and the second term are similar in response to the similarity value meeting a threshold value.

12. The non-transitory, machine-readable medium of claim 7, wherein the calculation of the term similarity value comprises a comparison of:
a first link associated with the first term and a second link associated with the second term;
a first link attribute associated with the first link and a second link attribute associated with the second link; and
a first link attribute definition associated with the first link attribute and a second link attribute definition associated with the second link attribute definition.

13. A system comprising:
a memory storage system to store a meta-model semantic network, the meta-model semantic network including a first term and a second term, the first term being associated with a first model and a first meta-model, the second term being associated with a second model and a second meta-model, wherein the first model comprises one or more first attributes that characterize the first term, wherein the second model comprises one or more second attributes that characterize the second term, wherein the first meta-model characterizes the first model, wherein the second meta-model characterizes the second model, and wherein a link and a link attribute define a relationship between at least two nodes of the semantic network;
a computer system in communication with the memory storage system, wherein the computer system comprises at least one processor and a computer-readable storage medium coupled to the at least one processor, the computer-readable storage medium comprising code executable by the processor for implementing a method comprising:
accessing the meta-model semantic network;
receiving a request to calculate a term similarity value, the term similarity value expressing a correlation between the first term and the second term;
calculating the term similarity value based on a distance between one of the first attributes of the first model and one of the second attributes of the second model, a distance between an attribute of the first meta-model and an attribute of the second meta-model, and a distance between an attribute of the first term and an attribute of the second term; and
modifying one or more of a search query or the meta-model semantic network based on the term similarity value.

14. The system of claim 13, wherein the method further comprises:
linking the first term to a concept in the meta-model semantic network; and
based on the calculated term similarity value, linking the second term to the concept.

15. The system of claim 13, wherein the method further comprises defining a first term sense associated with the first term, the first term sense including specified models and specified meta-models of the meta-model semantic network, wherein the calculation of the term similarity value comprises selecting the first model and the first meta-model based on the specified models and the specified meta-model included in the first term sense.

16. The system of claim 13, wherein the method further comprises sending an indication that the first term and the second term are similar in response to the similarity value meeting a threshold value.

17. The system of claim 13, wherein the calculation of the term similarity value comprises a comparison of:
   a first link associated with the first term and a second link associated with the second term,
   a first link attribute associated with the first link and a second link attribute associated with the second link, and
   a first link attribute definition associated with the first link attribute and a second link attribute definition associated with the second link attribute definition.

* * * * *